(12) United States Patent
Kamaga

(10) Patent No.: US 7,688,024 B2
(45) Date of Patent: Mar. 30, 2010

(54) CHARGE CONTROL DEVICE FOR VEHICLE

(75) Inventor: Ryuichi Kamaga, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/285,408

(22) Filed: Oct. 3, 2008

(65) Prior Publication Data

US 2009/0102433 A1 Apr. 23, 2009

(30) Foreign Application Priority Data

Oct. 23, 2007 (JP) ............................. 2007-275003

(51) Int. Cl.
*H02J 7/14* (2006.01)
*B60K 6/20* (2007.10)

(52) U.S. Cl. .................... 320/104; 320/165; 180/65.21; 180/65.29; 903/903

(58) Field of Classification Search .................. 320/104
See application file for complete search history.

(56) References Cited

U.S. PATENT DOCUMENTS 7,405,541 B2   7/2008  Inokuchi et al.

FOREIGN PATENT DOCUMENTS

| JP | 02146937 A | * | 6/1990 |
| JP | A-2-146937 |   | 6/1990 |
| JP | A-7-7860   |   | 1/1995 |
| JP | A-2000-270484 |   | 9/2000 |
| JP | A-2000-354332 |   | 12/2000 |
| JP | A-2007-143319 |   | 6/2007 |

OTHER PUBLICATIONS

"SAE Electric Vehicle Conductive Charge Coupler;" SAE Standards; SAE International; Nov. 2001.
"General Requirements for Electric Vehicle Conductive Charging System;" Japan Electric Vehicle Association Standard; Mar. 29, 2001 (w/ translation).

* cited by examiner

*Primary Examiner*—Edward Tso
*Assistant Examiner*—Johali A Torres Ruiz
(74) *Attorney, Agent, or Firm*—Oliff & Berridge, PLC

(57) ABSTRACT

A resistor is connected to first and second terminals included in a vehicle inlet. To the first terminal, a control pilot line used for transmitting a pilot signal is connected. In the case where the vehicle inlet is not connected to a connector, a switch is turned off. A voltage generation circuit sets the potential of the second terminal to a potential higher than a vehicle earth potential. In the case where the vehicle inlet is not connected to the connector and the control pilot line is broken, the potential generated on the control pilot line is substantially equal to the earth potential level. Based on the potential of the control pilot line, a control unit detects a break.

4 Claims, 9 Drawing Sheets

CHARGE CONTROL DEVICE FOR VEHICLE

This nonprovisional application is based on Japanese Patent Application No. 2007-275003 filed on Oct. 23, 2007 with the Japan Patent Office, the entire contents of which are hereby incorporated by reference.

BACKGROUND OF THE INVENTION

1. Field of the Invention

The present invention relates to a charge control device for a vehicle, and particularly to a charge control device for a vehicle that is configured to be capable of charging a power storage device used for driving the vehicle, with electric power from a power supply outside the vehicle.

2. Description of the Background Art

An electric-powered vehicle is mounted with a power storage device (such as secondary battery or capacitor for example) and travels by using driving force generated from electric power stored in the power storage device. The electric-powered vehicle includes, for example, electric vehicle, hybrid vehicle and fuel-cell vehicle.

In recent years, a technique has been proposed for charging a power storage device mounted on such electric-powered vehicles as described above by a commercial power supply having a high power generation efficiency. With this technique, increase in fuel consumption efficiency of the hybrid vehicle for example can be expected. In particular, attention is given to a technique for charging a power storage device mounted on an electric-powered vehicle by a commercial power supply providing electric power to each household (a source of a relatively low voltage such as 100 V or 200 V, for example). In the following, a vehicle having a power storage device such as a battery mounted on the vehicle and configured to be chargeable by an external power supply for the vehicle is also referred to as "plug-in vehicle."

A technique has heretofore been proposed that is used for detecting an abnormality occurring while a power storage device mounted on a vehicle is charged. For example, Japanese Patent Laying-Open No. 2000-270484 discloses an abnormality detection device capable of detecting an abnormality such as a break of a commercial power supply line or power failure. The abnormality detection device can detect an abnormality as described above after charging of an electric-powered vehicle is started.

Standards for the plug-in vehicle are established in the United States by "SAE Electric Vehicle Conductive Charge Coupler" ("SAE Electric Vehicle Conductive Charge Coupler," (US), SAE Standards, SAE International, November 2001), and established in Japan by "General Requirements for Electric Vehicle Conductive Charging System" ("General Requirements for Electric Vehicle Conductive Charging System," Japan Electric Vehicle Association Standard (Japan Electric Vehicle Standard), Mar. 29, 2001).

"SAE Electric Vehicle Conductive Charge Coupler" and "General Requirements for Electric Vehicle Conductive Charging System" define standards regarding for example a control pilot. The control pilot is defined as a control line connecting a control circuit for an EVSE (Electric Vehicle Supply Equipment) which supplies electric power from an on-premises power line to a vehicle and a ground portion of the vehicle via a vehicle-side control circuit. Based on a pilot signal transmitted via the control line, the state of connection of a charge cable is detected, whether or not electric power can be supplied from a power supply to the vehicle is determined, or the rated current of the EVSE is detected, for example.

"SAE Electric Vehicle Conductive Charge Coupler" and "General Requirements for Electric Vehicle Conductive Charging System," however, do not particularly define details of how to detect a break of the control line through which the pilot signal is transmitted. For example, from the mere fact that the potential of the control line is at the ground level, it cannot be determined whether the control line is broken, failure of power supply occurs or a charge cable is unintentionally disconnected from a receptacle. In the following, an abnormality in electric power supply to a vehicle, such as failure of power supply and unintentional disconnection of the charge cable from a receptacle, for example, is referred to as "power-supply-side abnormality."

The pilot signal is a requisite signal for controlling charging of the plug-in vehicle as described above. It is therefore extremely important for the plug-in vehicle to detect an abnormality in the pilot signal, especially detect a break of the control line through which the pilot signal is transmitted.

The abnormality detection device disclosed in Japanese Patent Laying-Open No. 2000-270484 cannot detect an abnormality unless the commercial power supply is connected to the vehicle. This abnormality detection device is therefore considered to be capable of detecting a power-supply-side abnormality only.

SUMMARY OF THE INVENTION

The present invention has been made for solving the above-described problem, and an object of the invention is to provide a charge control device for a vehicle that can detect a break of a control line through which a pilot signal is transmitted.

Another object of the invention is to provide a charge control device for a vehicle that can detect a power-supply-side abnormality.

According to an aspect of the present invention, there is provided a charge control device for a vehicle mounted with a power storage device for driving the vehicle, the charge control device being capable of charging the power storage device with a supply electric power from a power supply outside the vehicle in a case where the vehicle and the power supply are connected by a coupler. The coupler outputs a supply electric power signal indicating information about the supply electric power in a case where the coupler is connected to the vehicle and the power supply. The charge control device includes: a control line for transmitting the supply electric power signal; a resistor having one end connected to the control line; a potential setting circuit setting a potential of the other end of the resistor to a first potential in a case where the vehicle is connected to the coupler and setting the potential of the other end of the resistor to a second potential higher than the first potential in a case where the vehicle is not connected to the coupler; and an abnormality detection unit detecting a break of the control line based on a potential of the control line in a case where the vehicle is not connected to the coupler.

Preferably, the abnormality detection unit detects occurrence of the break of the control line in a case where the potential of the control line is different from the second potential.

Preferably, the charge control device further includes a charge connector configured to be connectable to the coupler. The charge connector includes a terminal receiving the supply electric power signal by being connected to the control line. The first potential is a vehicle earth potential. The potential setting circuit includes: a connection circuit electrically connecting the other end of the resistor to the vehicle earth potential when the charge connector is connected to the coupler and disconnecting the other end of the resistor from the vehicle earth potential when the charge connector is not connected to the coupler; and a pull-up circuit pulling up the potential of the other end of the resistor to the second potential when the charge connector is not connected to the coupler.

Preferably, the charge control device further includes a vehicle speed detection device detecting speed of the vehicle. The abnormality detection unit determines that the vehicle is not connected to the coupler and detects whether or not the break of the control line occurs in a case where the vehicle speed detection device detects that the speed of the vehicle is different from zero.

preferably, the abnormality detection unit detects an abnormality in supply of the supply electric power by the power supply based on the potential of the control line in a case where the vehicle is connected to the coupler.

Preferably, the charge control device further includes: a first AC rotating electric machine including a star-connected first polyphase winding as a stator winding; a second AC rotating electric machine including a star-connected second polyphase winding as a stator winding; a first inverter connected to the first polyphase winding for performing electric power conversion between the first AC rotating electric machine and the power storage device; a second inverter connected to the second polyphase winding for performing electric power conversion between the second AC rotating electric machine and the power storage device; a pair of electric power lines connected to a first neutral point of the first polyphase winding and to a second neutral point of the second polyphase winding, for providing the supply electric power from the power supply to the first neutral point and the second neutral point; and a charge control unit controlling the first inverter and the second inverter such that the electric power provided from the pair of electric power lines to the first neutral point and the second neutral point is voltage-converted to charge the power storage device.

Preferably, the vehicle includes a drive unit configured to be capable of driving the vehicle using electric power stored in the power storage device. The charge control device further includes: a charger connected in parallel with the drive unit to the power storage device and configured to be capable of providing the supply electric power from the power supply to the power storage device; and an electric power line provided between the charge connector and the charger for transmitting the supply electric power.

According to another aspect of the present invention, there is provided a charge control device for a vehicle mounted with a power storage device for driving the vehicle, the charge control device being capable of charging the power storage device with a supply electric power from a power supply outside the vehicle in a case where the vehicle and the power supply are connected by an EVSE (Electric Vehicle Supply Equipment). The EVSE outputs a pilot signal indicating information about the supply electric power in a case where the EVSE is connected to the vehicle and the power supply. The charge control device includes: a control pilot line for transmitting the pilot signal; a resistor having one end connected to the control pilot line; a potential setting circuit setting a potential of the other end of the resistor to a first potential in a case where the vehicle is connected to the EVSE and setting the potential of the other end of the resistor to a second potential higher than the first potential in a case where the vehicle is not connected to the EVSE; and an abnormality detection unit detecting a break of the control pilot line based on a potential of the control pilot line in a case where the vehicle is not connected to the EVSE.

Preferably, the abnormality detection unit detects occurrence of the break of the control pilot line in a case where the potential of the control pilot line is different from the second potential.

Preferably, the charge control device further includes a vehicle inlet configured to be connectable to the EVSE. The vehicle inlet includes a terminal receiving the pilot signal by being connected to the control pilot line. The first potential is a vehicle earth potential. The potential setting circuit includes: a connection circuit electrically connecting the other end of the resistor to the vehicle earth potential when the vehicle inlet is connected to the EVSE and disconnecting the other end of the resistor from the vehicle earth potential when the vehicle inlet is not connected to the EVSE; and a pull-up circuit pulling up the potential of the other end of the resistor to the second potential when the vehicle inlet is not connected to the EVSE.

Preferably, the charge control device further includes a vehicle speed detection device detecting speed of the vehicle. The abnormality detection unit determines that the vehicle is not connected to the EVSE and detects whether or not the break of the control pilot line occurs in a case where the vehicle speed detection device detects that the speed of the vehicle is different from zero.

Preferably, the abnormality detection unit detects an abnormality in supply of the supply electric power by the power supply based on the potential of the control pilot line in a case where the vehicle is connected to the EVSE.

Preferably, the charge control device further includes: a first AC rotating electric machine including a star-connected first polyphase winding as a stator winding; a second AC rotating electric machine including a star-connected second polyphase winding as a stator winding; a first inverter connected to the first polyphase winding for performing electric power conversion between the first AC rotating electric machine and the power storage device; a second inverter connected to the second polyphase winding for performing electric power conversion between the second AC rotating electric machine and the power storage device; a pair of electric power lines connected to a first neutral point of the first polyphase winding and to a second neutral point of the second polyphase winding, for providing the supply electric power from the power supply to the first neutral point and the second neutral point; and a charge control unit controlling the first inverter and the second inverter such that the electric power provided from the pair of electric power lines to the first neutral point and the second neutral point is voltage-converted to charge the power storage device.

Preferably, the vehicle includes a drive unit configured to be capable of driving the vehicle using electric power stored in the power storage device. The charge control device further includes: a charger connected in parallel with the drive unit to the power storage device and configured to be capable of providing the supply electric power from the power supply to the power storage device; and an electric power line provided between the vehicle inlet and the charger for transmitting the supply electric power.

Accordingly, the present invention can detect a break of the control line through which the pilot signal is transmitted as well as a power-supply-side abnormality while distinguishing the break and the abnormality from each other.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
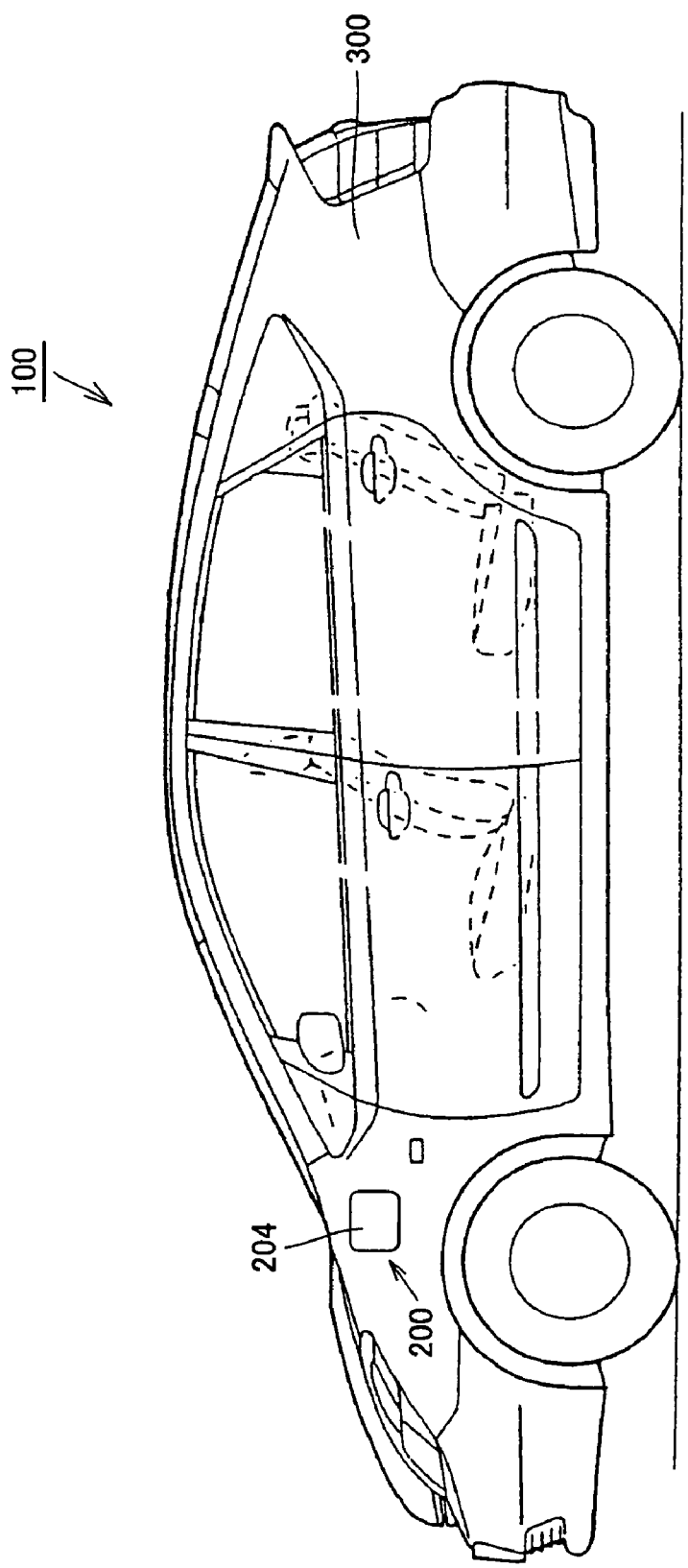
FIG. 1 is a side view of a vehicle 100 according to a first embodiment of the present invention.

In the following, embodiments of the present invention will be described in detail with reference to the drawings. In the drawings, like or corresponding components are denoted by like reference characters, and a description thereof will not be repeated.

In the embodiments of the present invention, a plug-in hybrid vehicle is exemplified as an electric-powered vehicle chargeable by an external power supply. The electric-powered vehicle chargeable by an external power supply, however, is not limited to the plug-in hybrid vehicle and may be an electric vehicle or fuel-cell vehicle, for example.

First Embodiment

A vehicle 100 according to a first embodiment of the present invention is mounted with an internal combustion engine (engine), a power storage device and an electric motor that is rotatably driven by electric power from the power storage device, and achieves a high fuel consumption efficiency by optimally distributing driving force generated by the internal combustion engine and that generated by the electric motor. Further, the power storage device mounted on vehicle 100 is chargeable with electric power from an external power supply (commercial power supply for example).

FIG. 1 is a side view of vehicle 100 according to the first embodiment of the present invention. Referring to FIG. 1, a connector protecting portion (charge port) 200 is formed in a vehicle body (body) 300. Connector protecting portion 200 is provided with a connector (not shown in FIG. 1) connected to a cable which is used for transmitting electric power supplied from a commercial power supply as well as a lid 204 for preventing water, dust particles and the like from entering the connector. FIG. 1 shows a structure where connector protecting portion 200 is formed on the left side and the front-wheel side of vehicle body 300. The position where connector protecting portion 200 is formed, however, is not limited to a particular one.

In the body of vehicle 100 according to the present embodiment, a fuel filler neck (not shown) for supplying fuel which is necessary for operating the internal combustion engine is formed.

Figure 2:
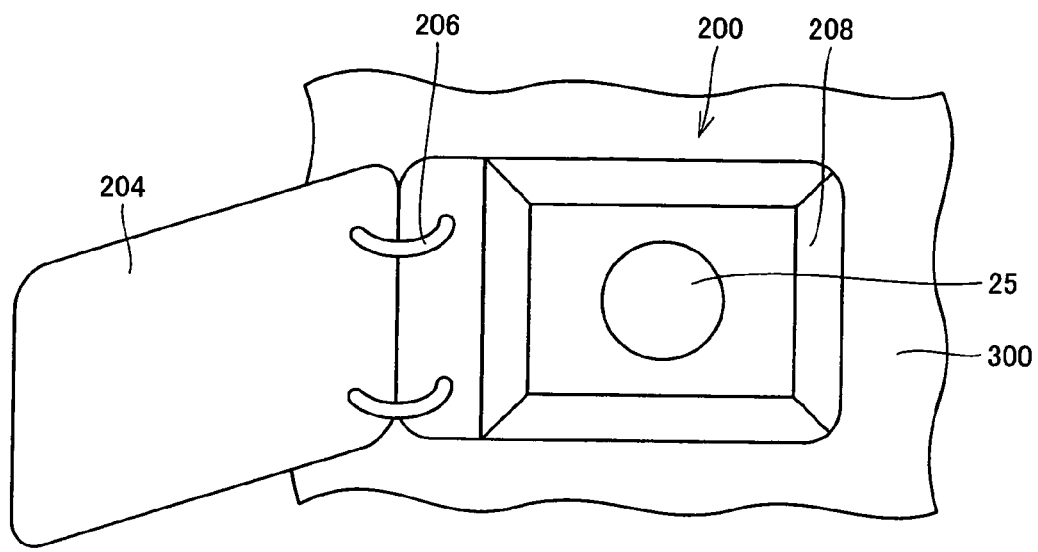
FIG. 2 is an external view of a connector protecting portion 200.

FIG. 2 is an external view of connector protecting portion 200. FIG. 2 shows the state where lid 204 is opened. Referring to FIG. 2, connector protecting portion 200 includes a housing 208 that is a depressed portion formed in the vehicle's external surface of body 300. Housing 208 houses a charge connector 25. Charge connector 25 corresponds to "vehicle inlet" defined by the SAE standards.

Lid 204 is pivotably supported by a support 206. A user can thus open and close lid 204.

Figure 3:
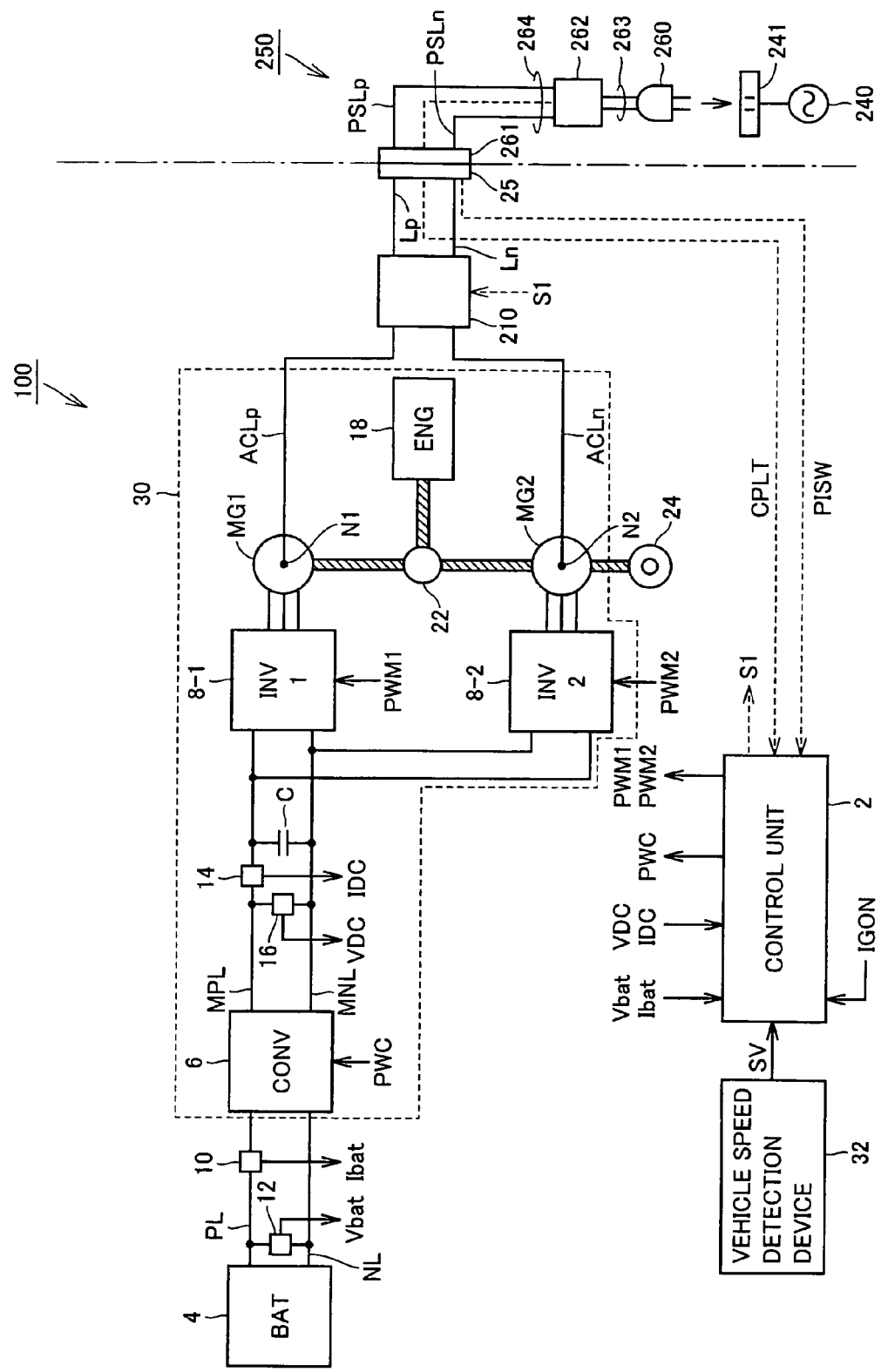
FIG. 3 is a schematic configuration diagram of vehicle 100.
Figure 4:
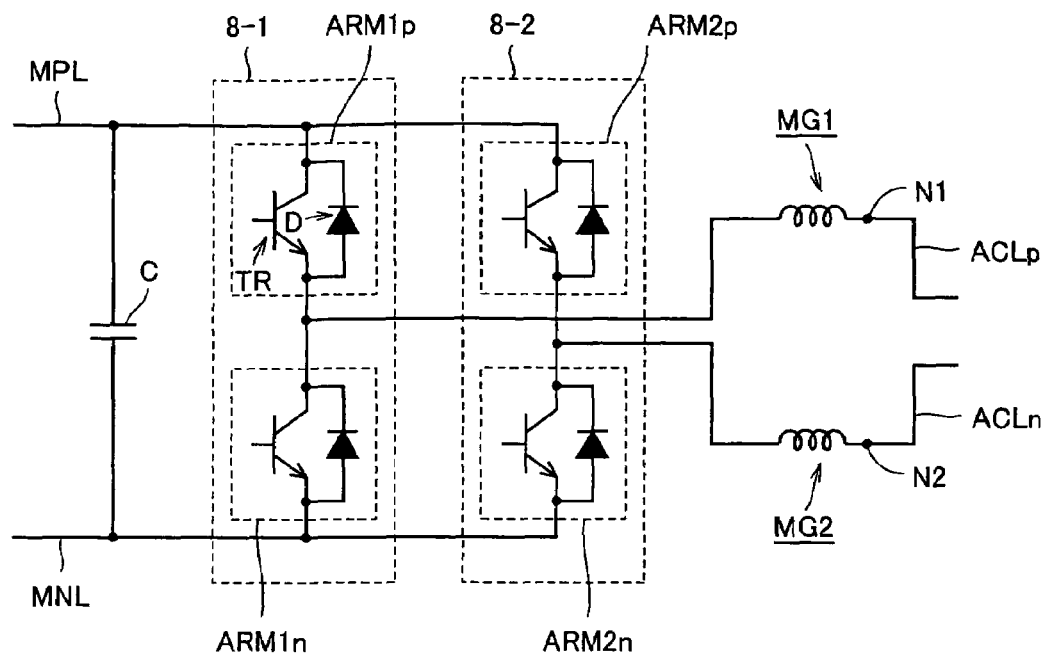
FIG. 4 is a diagram of a zero-phase equivalent circuit of inverters 8-1, 8-2 and motor generators MG1, MG2 in a zero-phase mode.

Referring further to FIGS. 3 and 4, a configuration of vehicle 100 will be described in more detail.

FIG. 3 is a schematic configuration diagram of vehicle 100. Referring to FIG. 3, vehicle 100 is a parallel/series hybrid vehicle.

Vehicle 100 includes a control unit 2 for controlling operation of vehicle 100, a power storage device (BAT) 4 storing electric power for generating driving force for vehicle 100, and a drive unit 30 that can drive vehicle 100 by using the electric power stored in power storage device 4. Drive unit 30 includes a converter (CONV) 6, a main positive line MPL, a main negative line MNL, a capacitor C, a first inverter (INV1) 8-1, a second inverter (INV2) 8-2, a motor generator MG1, a motor generator MG2, an internal combustion engine ENG 18, and a power split device 22.

Power storage device 4 is an electric power storage element that is configured to be chargeable and dischargeable. Power storage device 4 is formed, for example, of a secondary battery such as lithium-ion battery or nickel-hydrogen battery, or a power storage element such as electric double layer capacitor.

Converter 6 makes an interconversion between the input/output voltage of power storage device 4 and the voltage between main positive line MPL and main negative line MNL. The voltage conversion by converter 6 is controlled according to switching command PWC from control unit 2.

Capacitor C smoothes the voltage between main positive line MPL and main negative line MNL. Inverters 8-1, 8-2 are provided in association with motor generators MG1, MG2 respectively. Inverters 8-1, 8-2 are electrically connected, in parallel with each other, to power storage device 4. Inverters 8-1, 8-2 make an interconversion between DC (direct current) power and AC (alternating current) power.

Vehicle 100 further includes charge connector 25, an AC port 210 and electric power lines Lp, Ln, ACLp, ACLn.

AC port 210 electrically connects electric power line Lp and electric power line ACLp and further electrically connects electric power line Ln and electric power line ACLn, in response to signal S1. Control unit 2 generates signal S1 for controlling the electrical connection between electric power line Lp and electric power line ACLp as well as the electrical connection between electric power line Ln and electric power line ACLn, and outputs the signal to AC port 210.

AC port 210 is connected by electric power lines Lp, Ln to charge connector 25. AC port 210 is further connected by electric power lines ACLp and ACLn to a neutral point N1 of motor generator MG1 and a neutral point N2 of motor generator MG2.

Figure 10:
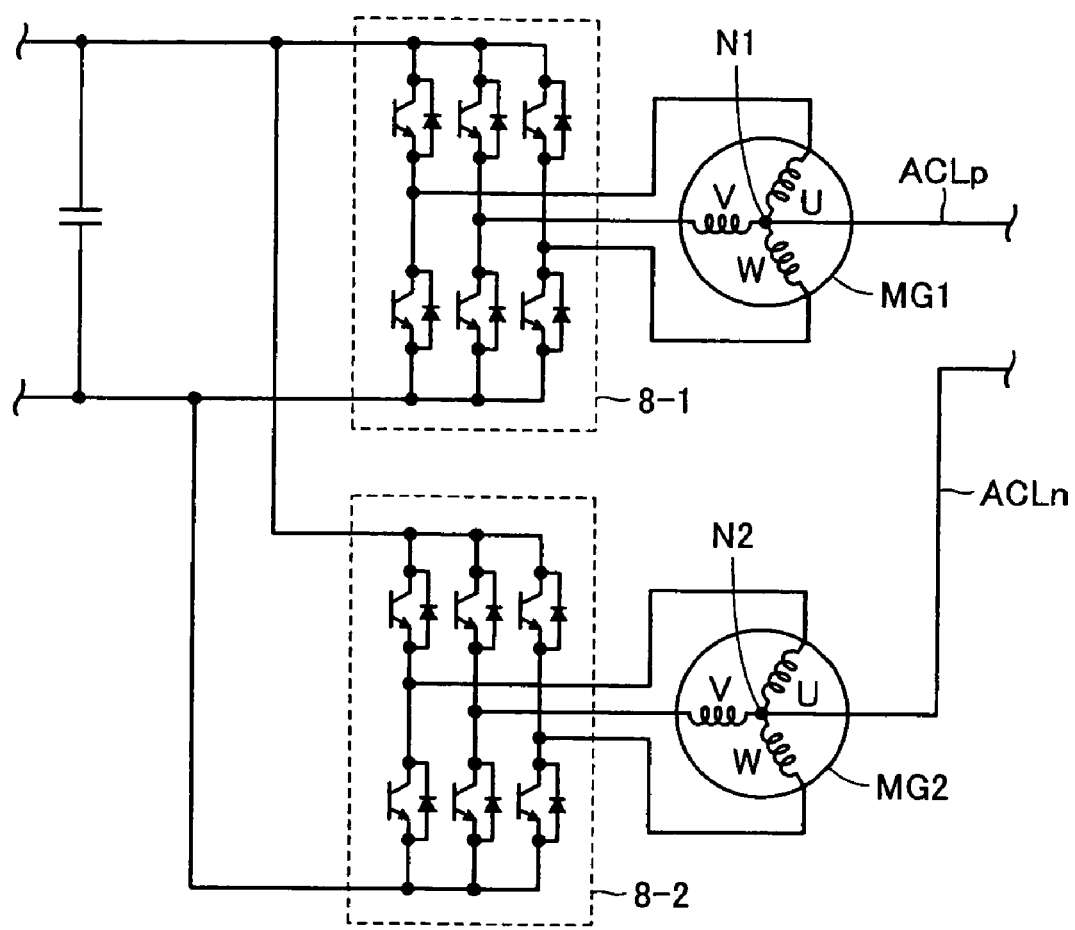
FIG. 10 is a diagram showing three coils included in motor generators MG1, MG2 each.

As shown in FIG. 10, motor generators MG1 and MG2 each include a stator having a U phase coil, a V phase coil and a W phase coil that are Y-connected (star-connected). The point where the Y-connected three coils of each motor generator are commonly connected corresponds to neutral point N1 of motor generator MG1 or neutral point N2 of motor generator MG2.

Referring back to FIG. 3, in the case where power storage device 4 is charged by external power supply 240, the electric power from external power supply 240 is transmitted to vehicle 100 by a coupler 250. Coupler 250 includes a plug 260, a connector 261, a CCID (Charging Circuit Interrupt Device) 262, and charge cables 263, 264. Charge cable 264 includes electric power lines PSLp, PSLn. Coupler 250 corresponds to an EVSE (Electric Vehicle Supply Equipment) defined by the SAE standards.

Plug 260 is connected to a connector 241 that is electrically coupled to external power supply 240. Connector 261 is connected to charge connector 25. Accordingly, electric power lines PSLp, Lp, ACLp are electrically connected and electric power lines PSLn, Ln, ACLn are electrically connected.

Control unit 2 receives cable connection signal PISW indicating that connector 261 and charge connector 25 are connected. Based on the voltage level of cable connection signal PISW, control unit 2 detects that connector 261 is connected to charge connector 25.

Here, the voltage value and the type (DC or AC) of the electric power supplied from external power supply 240 are not limited to particular ones. For example, a commercial power supply providing electric power to each household may be used as external power supply 240. In the present embodiment, external power supply 240 is a commercial single-phase AC power supply (with its voltage value of 100 V or 200 V).

CCID 262 is provided between charge cables 263, 264. CCID 262 electrically connects/disconnects charge cable 263 and charge cable 264 to/from each other. Further, CCID 262 is operated by electric power provided from external power supply 240 in the case where plug 260 is connected to connector 241. CCID 262 generates pilot signal CPLT and outputs the generated pilot signal CPLT to control unit 2.

Between charge connector 25 and control unit 2, a signal line for transmitting pilot signal CPLT and a signal line for transmitting cable connection signal PISW are provided. Control unit 2 receives pilot signal CPLT and cable connection signal PISW via these signal lines.

The electric power of the external power supply is supplied to neutral points N1, N2 of motor generators MG1, MG2, and accordingly the voltage of electric power line PSLp is applied to each phase on the AC side of inverter 8-1, and the voltage of electric power line PSLn is applied to each phase on the AC side of inverter 8-2. In response to respective switching commands PWM1, PWM2, inverters 8-1, 8-2 perform switching operation. Thus, DC electric power having a predetermined voltage value is supplied from inverters 8-1, 8-2 to main positive line MPL and main negative line MNL.

More specifically, as shown in FIG. 10, inverters 8-1, 8-2 each include three arm circuits corresponding respectively to three phases on the AC side. Each arm circuit includes an upper arm circuit and a lower arm circuit each having at least one switching element.

In inverters 8-1, 8-2 each, the upper arm circuits corresponding to respective phases are all turned on/off together, and the lower arm circuits corresponding to respective phases are also all turned on/off together. Thus, in inverters 8-1, 8-2 each, the three upper arm circuits can be regarded as being in the same switching state (all of the circuits are on or off). Similarly, the three lower arm circuits can be regarded as being in the same switching state. By this switching operation, respective phase voltages can be made equal to each other. Here, such a switching mode is also referred to as zero-phase mode.

FIG. 4 shows a zero-phase equivalent circuit of inverters 8-1, 8-2 and motor generators MG1, MG2 in the zero-phase mode. Referring to FIG. 4, in the case where inverters 8-1, 8-2 perform the switching operation according to the above-described zero-phase mode, the three upper arm circuits of inverter 8-1 may be collectively represented as upper arm ARM1p, and the three lower arm circuits of inverter 8-1 may be collectively represented as lower arm ARM1n. Upper arm ARM1p and lower arm ARM1n are each formed of a switching element TR and a free-wheeling diode D. Similarly, the three upper arm circuits of inverter 8-2 may be collectively represented as upper arm ARM2p and the three lower arm circuits of inverter 8-2 may be collectively represented as lower arm ARM2n.

The zero-phase equivalent circuit shown in FIG. 4 can be regarded as a single phase inverter that can convert the DC power supplied through main positive line MPL and main negative line MNL into single-phase AC power, and convert single-phase AC power that is input to neutral points N1 and N2 through electric power lines ACLp, ACLn into DC power.

Specifically, inverters 8-1, 8-2 are controlled so that the zero-phase mode can be implemented, and accordingly inverters 8-1, 8-2 can be operated equivalently as single-phase inverters. Thus, the single-phase AC power supplied from external power supply 240 can be converted into the DC power, and this DC power can be supplied to main positive line MPL and main negative line MNL. The DC power is used to charge power storage device 4.

Referring again to FIG. 3, the configuration of vehicle 100 will be further described. Internal combustion engine ENG 18 is operated through combustion of fuel. Motor generator MG1 can generate electric power by receiving a part of the motive power from internal combustion engine ENG 18. Motor generator MG2 operates as an electric motor using the electric power from power storage device (BAT) 4.

Internal combustion engine ENG 18 and motor generators MG1, MG2 are mechanically coupled to each other via power split device 22. Power split device 22 is typically formed of a planetary gear train.

When vehicle 100 is traveling, inverter 8-1 mainly converts the AC power generated by motor generator MG1 into DC power in response to switching command PWM1 from control unit 2. Inverter 8-2 converts, in response to switching command PWM2 from control unit 2, the DC power supplied through main positive line MPL and main negative line MNL into AC power and supplies the AC power to motor generator MG2. Power split device 22 splits the driving force generated by the operation of internal combustion engine ENG 18 into two components and delivers the one to motor generator MG1 and the other to motor generator MG2.

The driving force delivered from power split device 22 to motor generator MG1 is used for generating electric power. The electric power generated by motor generator MG1 is used for charging power storage device 4, or used for generating driving force by motor generator MG2. The driving force delivered to motor generator MG2 is combined with driving force generated by motor generator MG2 to be used for driving drive wheels 24.

Here, the number of power storage devices and the capacity of the power storage device are not limited to particular ones. For example, a plurality of power storage devices may be mounted on vehicle 100. Thus, in the case where power storage devices 4 are charged by external power supply 240, power storage devices 4 can be sufficiently charged. In this case, the vehicle can travel by using only the driving force generated by motor generator MG2 while keeping internal combustion engine ENG 18 in the stopped state, namely the vehicle can travel in the so-called EV (Electric Vehicle) mode. For example, a larger quantity of electric power can be stored by increasing the number of power storage devices, so that the vehicle can travel over a longer distance in the EV mode.

Control unit 2 controls drive unit 30 so that vehicle 100 is ready to travel, in response to activation instruction IGON. Specifically, control unit 2 controls converter 6 and inverters 8-1, 8-2 based on information from current sensors 10, 14 and voltage sensors 12, 16. Current sensor 10 detects current That that is electric current flowing through electric power line PL (electric current input/output to/from power storage device 4). Voltage sensor 12 detects voltage Vbat between electric power lines PL and NL. Current sensor 14 detects current IDC flowing through main positive line MPL. Voltage sensor 16 detects voltage VDC between main positive line MPL and main negative line MNL. Control unit 2 receives respective values of current That and current IDC and respective values of voltage Vbat and voltage VDC and outputs switching commands PWM1, PWM2, PWC.

A vehicle speed detection device 32 detects speed SV of vehicle 100 and outputs the detected value of the speed to control unit 2.

In the following, CCID 262 will be described in more detail. When connector 261 is connected to charge connector 25 and the potential of pilot signal CPLT decreases to a prescribed value, CCID 262 causes pilot signal CPLT to oscillate with a prescribed duty (the ratio of the pulse width to the period of oscillation) cycle. This duty cycle is set based on the rated current that can be provided from external power supply 240 to vehicle 100 via coupler 250.

Figure 5:
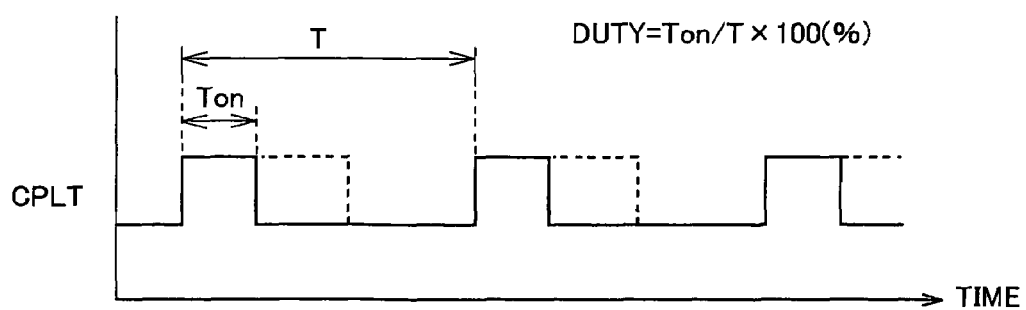
FIG. 5 is a diagram showing a waveform of pilot signal CPLT generated by a CCID (Charging Circuit Interrupt Device) 262 shown in FIG. 3.

FIG. 5 is a diagram showing a waveform of pilot signal CPLT generated by CCID 262 shown in FIG. 3. Referring to FIG. 5, pilot signal CPLT oscillates with a prescribed period T. A pulse width Ton of pilot signal CPLT is set based on the rated current that can be provided from external power supply 240 to vehicle 100 via coupler 250. Control unit 2 included in vehicle 100 receives pilot signal CPLT from CCID 262. Control unit 2 obtains information about the rated current from the duty represented by the ratio of pulse width Ton to period T.

The rated current is defined for each charge cable. For charge cables of different types, duties of pilot signal CPLT are different from each other because respective rated currents of the charge cables are different from each other. Control unit 2 receives pilot signal CPLT transmitted from CCID 262 via a control pilot line (control line), and detects the duty of the received pilot signal CPLT. Accordingly, control unit 2 can detect the rated current that can be supplied to vehicle 100. In other words, pilot signal CPLT is a supply electric power signal indicating information about the supply electric power provided to vehicle 100.

Figure 6:
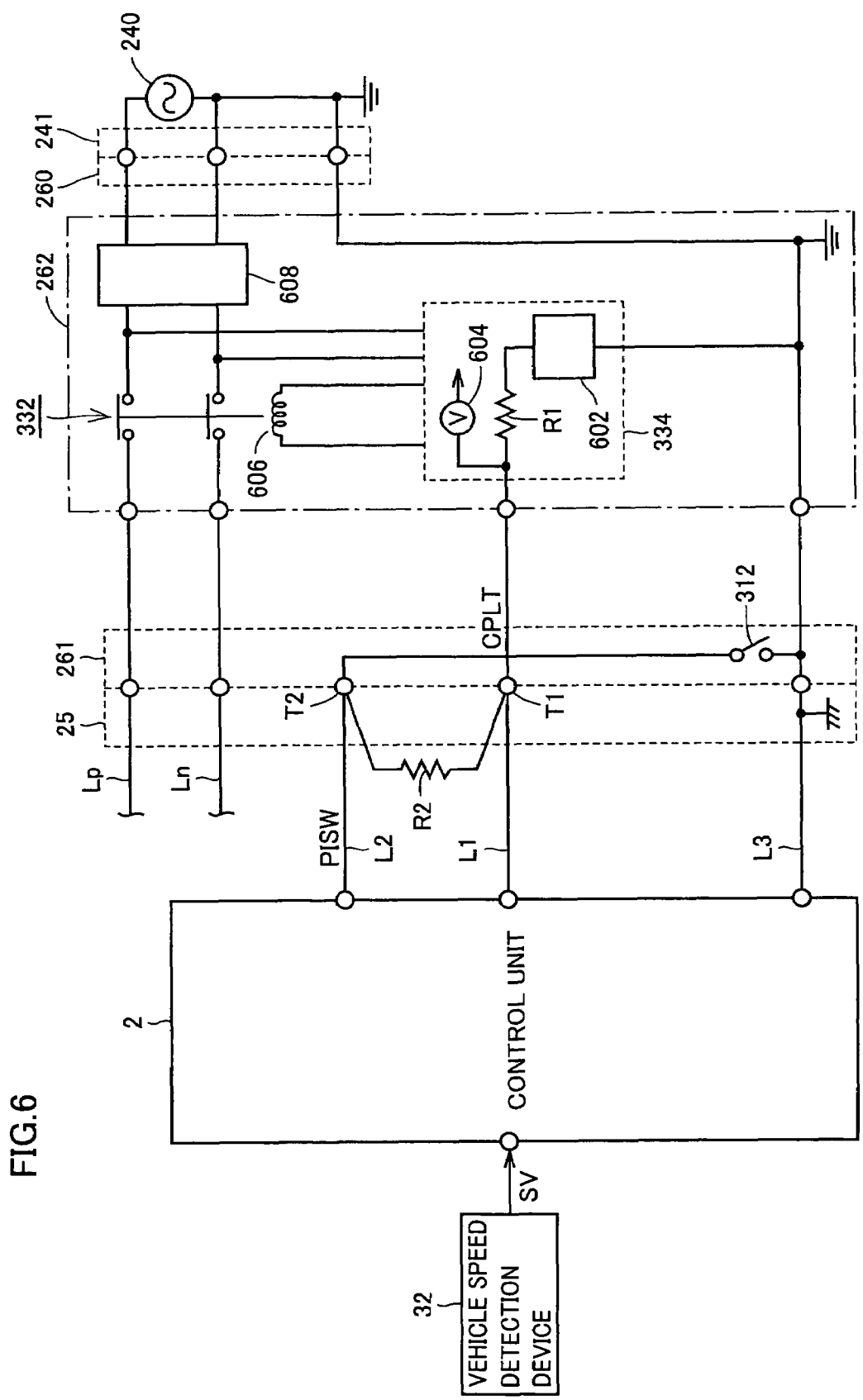
FIG. 6 is a diagram illustrating a configuration of CCID 262 shown in FIG. 3.

FIG. 6 is a diagram illustrating a configuration of CCID 262 shown in FIG. 3. Referring to FIG. 6, CCID 262 includes a relay 332, a control pilot circuit 334, an electromagnetic coil 606, and an electrical leakage detector 608. Control pilot circuit 334 includes an oscillator 602, a resistor R1 and a voltage sensor 604.

When connector 241 and plug 260 are connected, oscillator 602 receives electric power provided from external power supply 240. Oscillator 602 is operated by this electric power. Oscillator 602 outputs a non-oscillating signal when the potential of pilot signal CPLT detected by voltage sensor 604 is close to a prescribed potential V1 (12 V for example), and outputs a signal oscillating at a prescribed frequency (1 kHz for example) and a prescribed duty cycle when the potential of pilot signal CPLT decreases from V1. As described hereinlater, the potential of pilot signal CPLT is changed by changing the resistance value of a resistance circuit included in control unit 2.

Control pilot circuit 334 supplies electric current to electromagnetic coil 606 when the potential of pilot signal CPLT is close to a prescribed potential V3 (6 V for example). Electromagnetic coil 606 generates an electromagnetic force when supplied with electric current from control pilot circuit 334 and turns on relay 332. When connector 261 is connected to charge connector 25 and relay 332 is turned on, a pair of electric power lines used for supplying charge electric power from external power supply 240 to the plug-in hybrid vehicle is electrically connected to electric power lines Lp, Ln.

Electrical leakage detector 608 is provided on the pair of electric power lines used for supplying charge electric power from external power supply 240 to the plug-in hybrid vehicle, for detecting whether electrical leakage occurs or not. Specifically, electrical leakage detector 608 detects the state of balance between electric currents flowing in the opposite directions through the pair of electric power lines. When the state of balance is lost, electrical leakage detector 608 detects occurrence of electrical leakage. When electrical leakage is detected by electrical leakage detector 608, power supply to electromagnetic coil 606 is interrupted and relay 332 is turned off, which is not particularly shown. The potential of pilot signal CPLT is fixed to a prescribed negative potential (−12 V for example).

Pilot signal CPLT is output from control pilot circuit 334 to a terminal T1. Terminal T1 is connected by control pilot line L1 to control unit 2. Accordingly, pilot signal CPLT which is output from control pilot circuit 334 is input to control unit 2 via control pilot line L1.

Connector 261 is provided with a switch 312. Switch 312 is connected between a terminal T2 and a ground node. Further, terminal T2 and control unit 2 are connected by a signal line L2. When connector 261 is connected to charge connector 25, switch 312 is turned on. Thus, cable connection signal PISW indicating that connector 261 is connected to charge connector 25 is input via signal line L2 to control unit 2. A ground terminal of control unit 2 is connected by a ground line L3 to the ground node.

Control unit 2 further receives speed SV of the vehicle detected by vehicle speed detection device 32.

A resistor R2 is connected between terminals T1, T2. When charge connector 25 is connected to connector 261, switch 312 is turned on so that terminal T2 is connected to the ground node. In contrast, when charge connector 25 is not connected to connector 261, switch 312 is turned off so that terminal T2 is disconnected from the ground node and the potential of terminal T2 is set higher than the ground potential. Accordingly, the present embodiment can detect a break of control pilot line L1. In the present embodiment, particularly when vehicle 100 is not connected to external power supply 240, namely charge connector 25 is not connected to connector 261, a break of control pilot line L1 can be detected.

Further, in the present embodiment, when charge connector 25 is connected to connector 261, a power-supply-side abnormality can be detected based on whether or not the potential of control pilot line L1 changes. Here, "power-supply-side abnormality" means an abnormality in power supply to vehicle 100 and includes, for example, disconnection between plug 260 and connector 241 or failure of power supply from external power supply 240.

Figure 7:
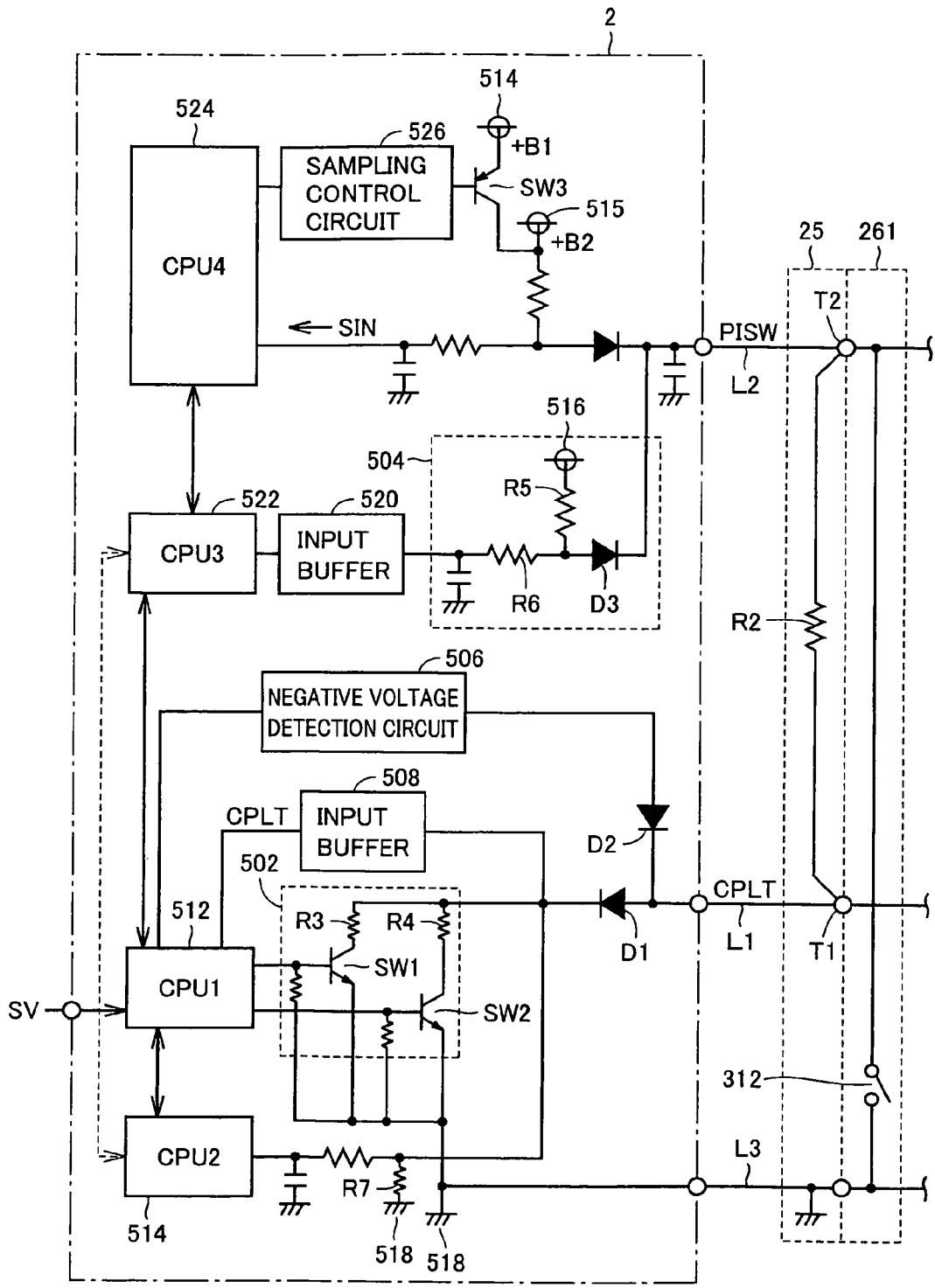
FIG. 7 is a diagram illustrating a configuration of a control unit 2 shown in FIG. 3.

FIG. 7 is a diagram illustrating a configuration of control unit 2 shown in FIG. 3. Referring to FIG. 7, control unit 2 includes diodes D1, D2, a resistance circuit 502, a voltage generation circuit 504, a negative voltage detection circuit 506, input buffers 508, 520, CPUs (Control Processing Units) 512, 514, 522, 524, and a sampling control circuit 526.

Resistance circuit 502 includes pull-down resistors R3, R4 and switches SW1, SW2. Pull-down resistor R3 and switch SW1 are connected in series between control pilot line L1 through which pilot signal CPLT is transmitted and a vehicle earth 518. Pull-down resistor R4 and switch SW2 are connected in series between control pilot line L1 and vehicle earth 518, and connected in parallel with series-connected pull-down resistor R3 and switch SW1. Switches SW1, SW2 are turned on/off in response to a control signal from CPU 512.

Resistance circuit 502 changes the potential of pilot signal CPLT by turning on/off switches SW1, SW2 in response to the control signal from CPU 512. Specifically, when switch SW1 is turned off and switch SW2 is turned on in response to the control signal from CPU 512, pull-down resistor R4 causes the potential of pilot signal CPLT to decrease to a prescribed potential V2 (9 V for example). Further, when switch SW1 is turned on in response to the control signal from CPU 512, pull-down resistors R3, R4 cause the potential of pilot signal CPLT to decrease to prescribed potential V3 (6 V for example).

Voltage generation circuit 504 includes a power supply node 516, a pull-up resistor R5, a resistor R6, and a diode D3. When connector 261 is not connected to charge connector 25, voltage generation circuit 504 generates a voltage on control pilot line L1 that is determined by voltage division using pull-up resistor R5, resistor R2 connected between terminals T1, T2 and a pull-down resistor R7.

Negative voltage detection circuit 506 detects that the potential of pilot signal CPLT is fixed to a prescribed negative potential (−12 V for example) and outputs the result of detection to CPU 512. The case where the potential of pilot signal CPLT is fixed to a prescribed negative potential corresponds to the case where electrical leakage is detected by electrical leakage detector 608 (see FIG. 6). The method for detecting a negative potential by negative voltage detection circuit 506 is not limited to a particular one.

Input buffer 508 receives pilot signal CPLT on control pilot line L1 and outputs the received pilot signal CPLT to CPU 512.

Voltage generation circuit 504 receives cable connection signal PISW via signal line L2. Voltage generation circuit 504 outputs a signal according to cable connection signal PISW. Receiving the signal from voltage generation circuit 504, input buffer 520 outputs the signal to CPU 522.

When connector 261 is connected to charge connector 25, switch 312 is turned on so that the potential of signal line L2 becomes the ground level. In contrast, when connector 261 is not connected to charge connector 25, switch 312 is turned off so that the potential of signal line L2 becomes a first potential higher than the ground level. In other words, cable connection signal PISW has an L (logical low) level when connector 261 is connected to the charge connector and has an H (logical high) level when connector 261 is not connected to the charge connector.

When cable connection signal PISW has L level, the signal of L level is applied to input buffer 520. When cable connection signal PISW has H level, the signal of H level is applied to input buffer 520. CPU 522 determines that connector 261 is connected to charge connector 25 when CPU 522 receives the signal of L level.

When signal line L2 is broken, the potential of the signal that is input to input buffer 520 has a second potential higher than the above-described first potential. When the potential of the signal received from input buffer 520 is the second potential, CPU 522 determines that signal line L2 is broken.

CPU 522 remains stopped until started by CPU 524. Further, CPU 512 remains stopped until started by CPU 514. CPU 524 starts CPU 522 when CPU 524 detects that connector 261 is connected to charge connector 25. CPU 514 starts CPU 512 in response to the start of CPU 522.

CPU 524 controls sampling control circuit 526 such that sampling control circuit 526 outputs a control signal used for repeatedly turning on/off a switch SW3. The on-period of switch SW3 or the timing at which switch SW3 is turned on is not limited to a particular one.

In the case where connector 261 is not connected to charge connector 25, the potential of signal SIN that is input to CPU 524 is equal to potential B2 of a node 515 when switch SW3 is turned on, and equal to potential B1 of a node 514 when switch SW3 is turned off. In contrast, in the case where connector 261 is connected to charge connector 25, the potential of signal SIN decreases to the ground level regardless of whether switch SW3 is turned on or off. When CPU 524 detects that the potential of signal SIN is the ground level, CPU 524 determines that connector 261 is connected to charge connector 25 and accordingly starts CPU 522.

When CPU 522 is started by CPU 524, CPU 522 receives a signal from input buffer 520. When the signal from input buffer 520 has L level, CPU 522 determines that connector 261 is connected to charge connector 25.

CPU 514 monitors the state of CPU 522, and starts CPU 512 when CPU 522 is started by CPU 524.

When CPU 512 is started by CPU 514, CPU 512 receives pilot signal CPLT from input buffer 508. Further, when CPU 512 receives from CPU 522 the result of determination that connector 261 is connected to charge connector 25, CPU 512 activates a control signal to be output to switch SW2. After this, CPU 512 detects the rated current that can be supplied from external power supply 240 to vehicle 100, based on pilot signal CPLT that starts oscillating in response to turn-on of switch SW2.

When the rated current is detected and preparation for charging power storage device 4 by external power supply 240 is completed, CPU 512 further activates a control signal to be output to switch SW1 and sends signal S1 to AC port 210 shown in FIG. 3. Accordingly, as shown in FIG. 3, the AC power from external power supply 240 is provided to neutral point N1 of motor generator MG1 and neutral point N2 of motor generator MG2 (both are not shown), and charge control of power storage device 4 is performed.

CPU 512 determines, in the state where connector 261 is connected to charge connector 25, whether or not an abnormality occurs in supply of electric power from the power supply side. Based on whether or not the potential of pilot signal CPLT changes, CPU 512 determines whether or not an abnormality occurs in supply of electric power, which will be described hereinlater in detail.

CPU 512 determines, in the state where connector 261 is not connected to charge connector 25, whether or not control pilot line L1 is broken. Specifically, CPU 512 determines whether or not control pilot line L1 is broken in the case where speed SV of vehicle 100 as detected by vehicle speed detection device 32 (see FIG. 3) is different from zero.

The case where speed SV is different from zero refers to the case where vehicle 100 is traveling. When vehicle 100 is charged by external power supply 240, it is considered that vehicle 100 is stopped. In other words, when vehicle 100 is traveling, it is considered that vehicle 100 is not connected to an external power supply. Therefore, in the case where speed SV is larger than zero, CPU 512 determines whether or not control pilot line L1 is broken. In this way, a break of a line can be accurately detected.

As long as the conditions that CPU 512 is started and connector 261 is not connected to charge connector 25 are satisfied, CPU 512 can detect a break of control pilot line L1. In the present embodiment, a break of the control pilot line is detected while the vehicle is traveling. However, as long as the above-described conditions are satisfied, the timing at which CPU 512 detects a break of control pilot line L1 is not limited to a particular one.

CPU 512 determines, under the condition that connector 261 is connected to charge connector 25, whether or not an abnormality occurs on the power supply side, and determines, under the condition that connector 261 is not connected to charge connector 25, whether or not control pilot line L1 is broken. In this way, in the present embodiment, a break of control pilot line L1 and an abnormality on the power supply side can be distinguished from each other.

In the following, a description will be given of detection of a break of control pilot line L1 by CPU 512. Pull-up resistor R5, resistor R2 and pull-down resistor R7 form a voltage divider circuit provided between power supply node 516 and vehicle earth 518. When connector 261 is not connected to charge connector 25 and control pilot line L1 is not broken, a voltage determined by voltage division using pull-up resistor R5, resistor R2 and pull-down resistor R7 is applied to control pilot line L1. Accordingly, the potential of control pilot line L1 is higher than the ground potential (vehicle earth potential). Namely, the potential of control pilot line L1 has H level.

In contrast, when control pilot line L1 is broken, the potential generated on control pilot line L1 is substantially the ground level. Namely, the potential of control pilot line L1 has L level.

More specifically, when vehicle 100 is connected to coupler 250, the potential of terminal T2 (one end of resistor R2) is set to the vehicle earth potential by switch 312. In contrast, when vehicle 100 is not connected to coupler 250, switch 312 disconnects terminal T2 from the vehicle earth potential. When vehicle 100 is not connected to coupler 250, voltage generation circuit 504 sets (pulls up) the potential of terminal T2 to a potential higher than the vehicle earth potential.

Thus, the potential level of control pilot line L1 in the case where control pilot line L1 is normal and the potential level of control pilot line L1 in the case where control pilot line L1 is broken are different from each other. Therefore, a break of control pilot line L1 can be detected. CPU 512 determines that control pilot line L1 is broken when the potential of control pilot line L1 has L level, and determines that control pilot line L1 is normal when the potential of control pilot line L1 has H level.

Preferably, the resistance value of resistor R2 is set to a value that does not influence the change of the potential of pilot signal CPLT in resistance circuit 502. In order to set potentials V1 to V3 to 12 V, 9 V and 6 V respectively, respective resistance values of pull-down resistors R3, R4 are assumed to be 1.3 (kΩ) and 2.74 (kΩ) respectively. The resistance value of resistor R2 is set to a value (e.g. approximately 100 kΩ) sufficiently larger than these resistance values for example.

Figure 8:
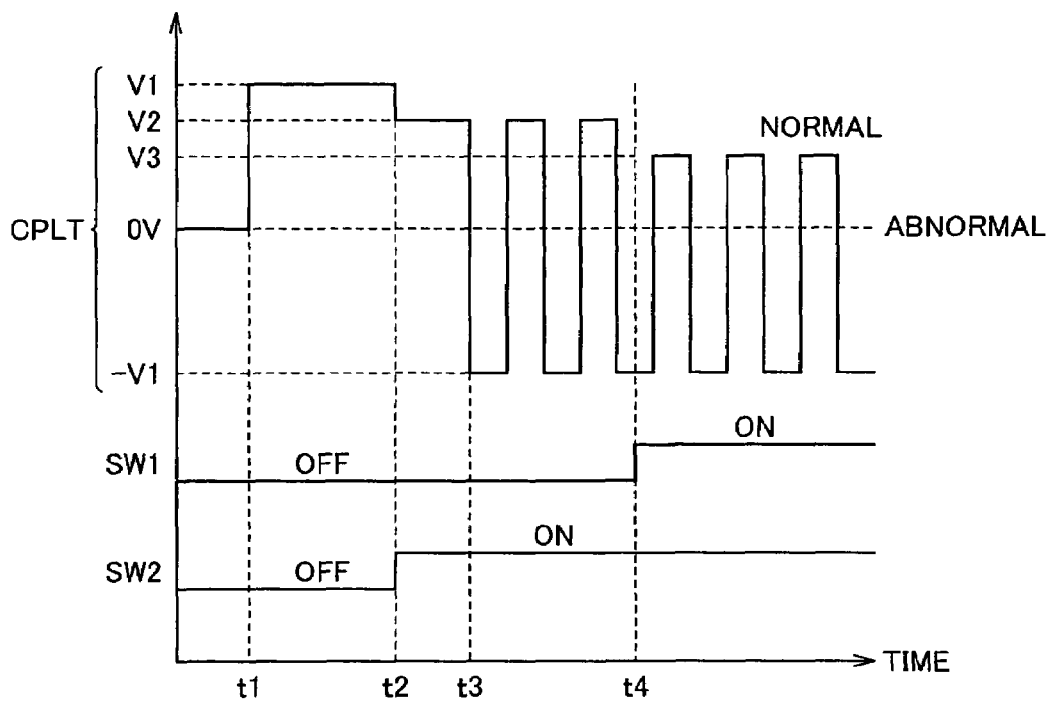
FIG. 8 is a timing chart for pilot signal CPLT and switches SW1, SW2 when charging is started.

FIG. 8 is a timing chart of pilot signal CPLT and switches SW1, SW2 when charging is started. Referring to FIGS. 6 to 8, plug 260 of coupler 250 is connected to connector 241 of external power supply 240 at time t1. Accordingly, control pilot circuit 334 receiving electric power from external power supply 240 generates pilot signal CPLT.

At this time, connector 261 of coupler 250 is not connected to charge connector 25 on vehicle 100 side. Therefore, the potential of pilot signal CPLT is V1 (12 V for example) and pilot signal CPLT is in the non-oscillating state.

At time t2, connector 261 is connected to charge connector 25. Based on cable connection signal PISW, connection of connector 261 and charge connector 25 is detected. Accordingly, switch SW2 is turned on. When switch SW2 is turned on, pull-down resistor R3 of resistance circuit 502 causes the potential of pilot signal CPLT to decrease to V2 (9 V for example).

The potential of pilot signal CPLT decreases to V2, and control pilot circuit 334 causes pilot signal CPLT to oscillate at time t3. Then, based on the duty of pilot signal CPLT, CPU 512 detects the rated current and preparation for charge control is made. When the preparation for charge control is completed, switch SW1 is turned on at time t4. When switch SW1 is turned on, pull-down resistor R3 of resistance circuit 502 causes the potential of pilot signal CPLT to further decrease to V3 (6 V for example).

When the potential of pilot signal CPLT decreases to V3, electric current is supplied from control pilot circuit 334 to electromagnetic coil 606 and relay 332 of CCID 330 is turned on. After this, AC port 210 is turned on and power storage device 4 is charged.

The description above relates to a change of pilot signal CPLT in the case where the supply of electric power from the power supply side is normal. When an abnormality occurs in supply of electric power from the power supply side such as power failure or disconnection of external power supply 240 and connector 261, the potential of control pilot line L1 remains 0 V because switch 312 is turned on and terminal T1 is connected via resistor R2 and terminal T2 to the switch.

Therefore, CPU 512 determines that an abnormality occurs in supply of electric power to be provided to the vehicle in the case where the potential of control pilot line L1 remains 0 V for a predetermined period of time from the time when connector 261 is connected to charge connector 25. In contrast, CPU 512 determines that electric power is normally supplied to the vehicle in the case where connector 261 is connected to charge connector 25 and the potential of control pilot line L1 changes.

Figure 9:
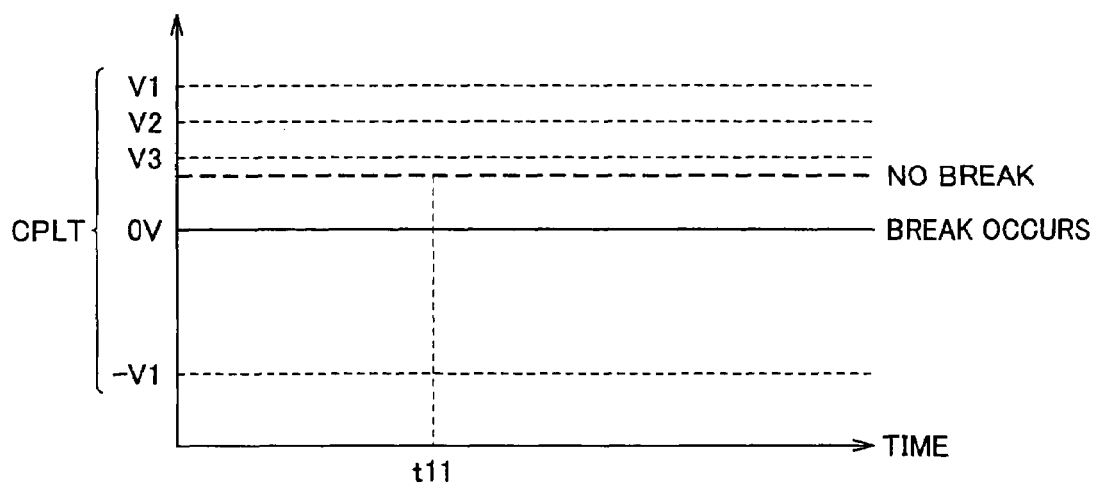
FIG. 9 is a diagram showing pilot signal CPLT when a break of a control pilot line L1 is detected.

FIG. 9 is a diagram showing pilot signal CPLT when a break of control pilot line L1 is detected. Referring to FIGS. 9 and 7, it is supposed that connector 261 of coupler 250 is detached from charge connector 25 on the vehicle side before time t11. When the vehicle starts traveling at time t11 so that vehicle speed SV is not zero, CPU 512 determines whether or not a break of control pilot line L1 occurs.

If control pilot line L1 is not broken, the potential of pilot signal CPLT does not decrease and is kept higher than 0 V. Namely, pilot signal CPLT is kept at H level. In contrast, if control pilot line L1 is broken, the potential of pilot signal CPLT decreases to the ground level (i.e., the vehicle earth potential and substantially 0 V) and thus pilot signal CPLT becomes L level. Therefore, CPU 512 can detect a break of control pilot line L1 by detecting the decrease of pilot signal CPLT to L level.

In the present embodiment, vehicle 100 may further include a detection device used for detecting an open/close state of lid 204. In this case, CPU 512 may determine whether or not control pilot line L1 is broken in the case where the detection device detects the closed state of lid 204 and speed SV of the vehicle is different from zero. Since the detection of a break is carried out under the conditions that lid 204 is in the closed state and vehicle speed SV is not zero, it can be ensured that detection of a break is prevented while charging is performed using pilot signal CPLT for charge control. Thus, a break of the line can be accurately detected.

Second Embodiment

Figure 11:
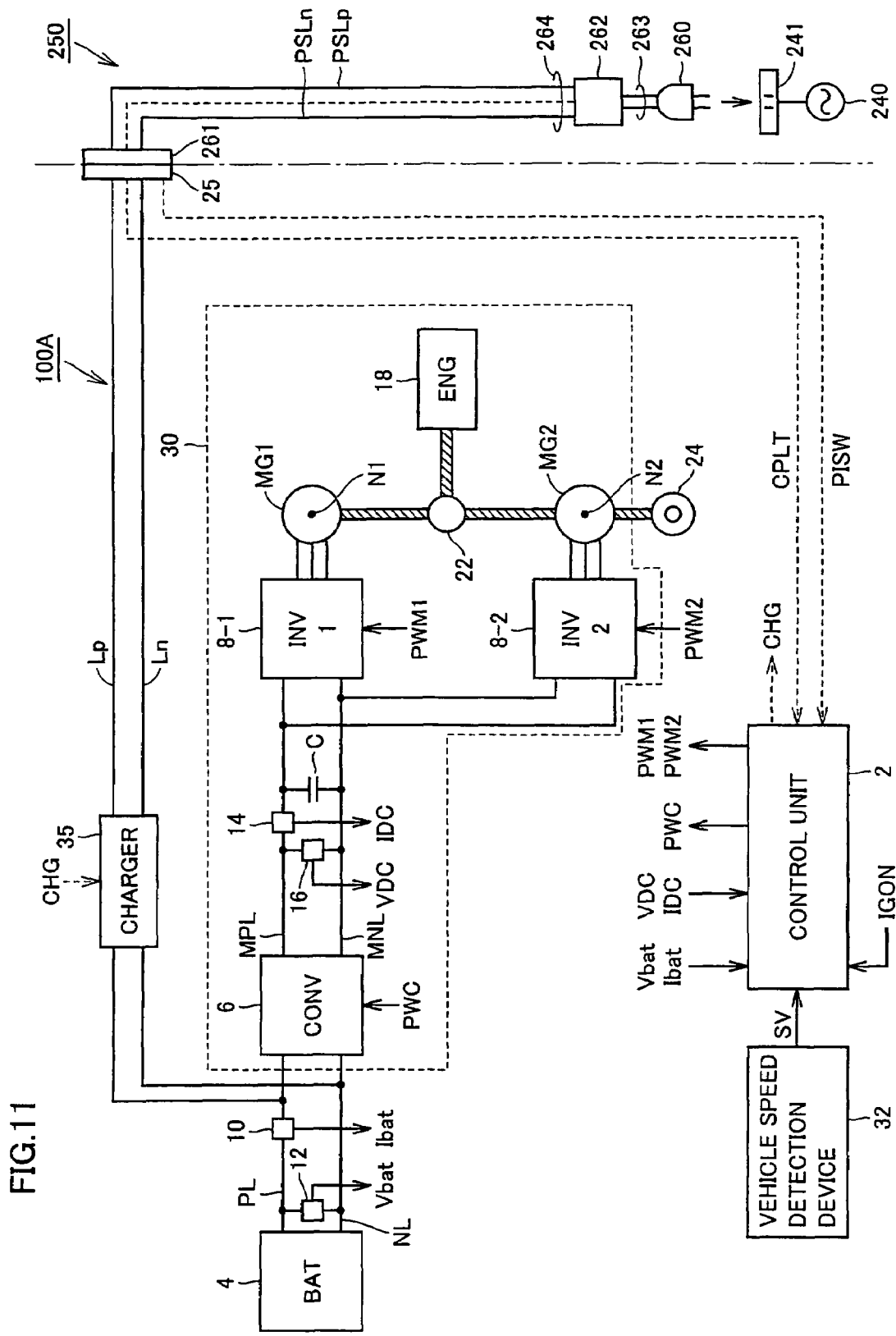
FIG. 11 is a schematic configuration diagram of a vehicle 100A according to a second embodiment of the present invention.

FIG. 11 is a schematic configuration diagram of a vehicle 100A according to a second embodiment of the present invention. Referring to FIGS. 11 and 3, vehicle 100A differs from vehicle 100 in that vehicle 100A includes a charger 35. Further, vehicle 100A differs from vehicle 100 in that vehicle 100A does not include AC port 210 and electric power lines ACLp, ACLn. Charger 35 is connected to power storage device 4 in parallel with drive unit 30. Charger 35 is connected by electric power lines Lp, Ln to charge connector 25, and connected by main positive line MPL and main negative line MNL to power storage device 4.

When plug 260 is connected to connector 241 and connector 261 is connected to charge connector 25 (vehicle inlet), electric power (AC power for example) from external power supply 240 is supplied via coupler 250 and electric power lines Lp, Ln to charger 35. Charger 35 supplies to power storage device 4 the electric power that is input via electric power lines Lp, Ln, and accordingly charges power storage device 4. In the case for example where charger 35 receives AC power via electric power lines Lp, Ln, the charger converts the AC power into DC power and outputs the DC power to main positive line MPL and main negative line MNL. The DC power is used to charge power storage device 4. Charger 35 performs this electric power conversion according to signal CHG from control unit 2.

Control unit 2 receives cable connection signal PISW indicating that connector 261 and charge connector 25 are connected. Control unit 2 detects that connector 261 is connected to charge connector 25 based on the voltage level of cable connection signal PISW. CCID 262 is operated by electric power provided from external power supply 240 when plug 260 is connected to connector 241. CCID 262 then generates pilot signal CPLT and outputs the generated pilot signal CPLT to control unit 2. Between charge connector 25 and control unit 2, a signal line used for transmitting pilot signal CPLT and a signal line used for transmitting cable connection signal PISW are provided (not shown). Control unit 2 receives pilot signal CPLT and cable connection signal PISW via these signal lines.

Other components of vehicle 100A are similar to corresponding components of vehicle 100 and therefore, the further description thereof will not be repeated.

The configuration and operation of CCID 262 are similar to those in the first embodiment. Further, the configuration and operation of control unit 2 are similar to those in the first embodiment. Therefore, the second embodiment can achieve the same effects as those of the first embodiment. Specifically, a break of control pilot line L1 can be detected in the second embodiment. In the present embodiment, particularly when vehicle 100 is not connected to external power supply 240, namely charge connector 25 is not connected to connector 261, a break of control pilot line L1 can be detected.

Moreover, in the second embodiment, an abnormality on the power supply side can be detected under the condition that charge connector 25 is connected to connector 261.

In the first embodiment, CPU 512 sends signal S1 to AC port 210 under the conditions that CPU 512 detects the rated current and preparation for charging power storage device 4 from external power supply 240 is completed. In contrast, in the second embodiment, CPU 512 sends signal CHG to charger 35 to operate charger 35 under the above-described conditions.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A charge control device for a vehicle mounted with a power storage device for driving the vehicle, the charge control device being capable of charging the power storage device with a supply electric power from a power supply outside the vehicle in a case where the vehicle and the power supply are connected by a coupler, the coupler outputting a supply electric power signal indicating information about the supply electric power in a case where the coupler is connected to the vehicle and the power supply, the charge control device comprising:
a control line for transmitting the supply electric power signal;
a resistor having one end connected to the control line;
a potential setting circuit setting a potential of the other end of the resistor to a first potential in a case where the vehicle is connected to the coupler and setting the potential of the other end of the resistor to a second potential higher than the first potential in a case where the vehicle is not connected to the coupler; and
an abnormality detection unit performing a detection of a break of the control line based on a potential of the control line in a case where the vehicle is not connected to the coupler.

2. The charge control device for a vehicle according to claim 1, the charge control device further comprising a charge connector provided in a charge port of the vehicle, and configured to be connectable to the coupler, wherein the charge connector includes a terminal being connected to the control line and receiving the supply electric power signal,
the first potential is a vehicle earth potential, and
the potential setting circuit includes:
a connection circuit electrically connecting the other end of the resistor to the vehicle earth potential when the charge connector is connected to the coupler and disconnecting the other end of the resistor from the vehicle earth potential when the charge connector is not connected to the coupler; and
a pull-up circuit pulling up the potential of the other end of the resistor to the second potential when the charge connector is not connected to the coupler.

3. The charge control device for a vehicle according to claim 2, the charge control device further comprising a vehicle speed detection device detecting speed of the vehicle, wherein
the abnormality detection unit determines that the vehicle is not connected to the coupler and performs the detection of a break of the control line in a case where the vehicle speed detection device detects that the speed of the vehicle is different from zero.

4. The charge control device for a vehicle according to claim 3, wherein
the abnormality detection unit detects an abnormality in supply of the supply electric power by the power supply based on whether the potential of the control line changes in a case where the vehicle is connected to the coupler.

* * * * *